US 7,630,367 B2

(12) United States Patent
Singh

(10) Patent No.: US 7,630,367 B2
(45) Date of Patent: Dec. 8, 2009

(54) APPROACH FOR FAST IP ADDRESS LOOKUPS

(75) Inventor: Dheeraj Singh, Bareilly (IN)

(73) Assignee: WIPRO Limited, Bangalore, Karnataka (IN)

( * ) Notice: Subject to any disclaimer, the term of this patent is extended or adjusted under 35 U.S.C. 154(b) by 375 days.

(21) Appl. No.: 11/469,504

(22) Filed: Sep. 1, 2006

(65) Prior Publication Data

US 2008/0056262 A1    Mar. 6, 2008

(51) Int. Cl.
*H04L 12/56* (2006.01)
(52) U.S. Cl. ...................................... 370/389
(58) Field of Classification Search ................ 370/351, 370/379, 389, 395.52, 428, 471; 709/245
See application file for complete search history.

(56) References Cited

U.S. PATENT DOCUMENTS

2004/0236720 A1* 11/2004 Basso et al. ................ 707/1
2004/0255045 A1* 12/2004 Lim et al. ................ 709/245

* cited by examiner

*Primary Examiner*—Chirag G Shah
*Assistant Examiner*—Yong Zhou
(74) *Attorney, Agent, or Firm*—Prakash Nama; Global IP Services, PLLC

(57) ABSTRACT

A method and algorithm for IP address lookup for packet forwarding, finds a longest prefix match for a destination address of n bits, using $2^{n/2}$ entries in a lookup table, expanding a given IP address to be matched if its prefix length is more than n/2, and, completing a lookup operation using the table. The number 'n" may be 32 or otherwise. An example teaches an IP address lookup table with a maximum address size of 32 bits, using a lookup table with $2^{16}$ entries. Further, if an IP prefix length is more than 16 bits, then the given address to be matched is expanded to its full prefix length before the lookup operation. The algorithm takes only two memory references for specific hardware, such as IXP1200. For generic hardware, it takes only three memory references. Also taught is a computer readable medium having the method encoded therein.

21 Claims, 5 Drawing Sheets

APPROACH FOR FAST IP ADDRESS LOOKUPS

FIELD OF THE INVENTION

This invention generally relates to message routing and forwarding in internet applications, and more particularly to performing IP address look up with a view to forwarding a message to its intended destination.

BACKGROUND OF THE INVENTION

Address lookup is one of the fundamental functions of a router, along with buffering, scheduling and switching of packets. The address lookup aspect is a particularly critical function for the building-routers that need to support multi-Gb/s links. The increasing traffic demand in the present internet scenario requires at least three key factors to keep pace if the Internet is to continue to provide good services: link speed, router data throughput, and packet forwarding rates. Readily available solutions exist for the first two factors. For example, fiber-optic cables can provide faster links, and switching technology can be used to move packets from the input interface of a router to the corresponding output interface at gigabit speed. There is still need for innovation with address look up and with the third factor, i.e., packet forwarding.

The major step in packet forwarding is to lookup the destination address (of an incoming packet) in the routing database. While there are other chores such as updating TTL (Tagging, Tracking, and Locating) fields, these chores are computationally inexpensive compared to the major task of address lookup. Bridges only do exact matching on the destination MAC (Media Access Control) address, while internet routers have to search their database for the longest prefix matching a destination IP (Internet Protocol) address. Thus, standard matching techniques for exact matching, such as perfect hashing, binary search, and standard Content Addressable Memories (CAMs) cannot be used for internet address lookups.

It is noted that prefix matching was introduced in the early 1990s, when Classless Inter-Domain Routing (CIDR) was deployed to allow for arbitrary aggregation of networks to reduce routing table entries. This means in principle that the prefixes are compared bit by bit to the given address and that the routing information associated with the longest of the matching prefixes should be used to forward the packet.

An IPv4 routing table comprises a set of routers, which is updated by routing protocols such as RIP (Routing Information Protocol) or OSPF (Open Shortest Path first), wherein each route determines the outgoing interface for a set of IP destination addresses, which is represented by an IP address and a subnet mask. Thus, presently an IP router's database consists of a number of address prefixes. IP routers do a routing lookup in a routing table to determine where IP datagrams are to be forwarded. The result of the operation is the next hop on the path to-wards the destination. An entry in a routing table is conceptually an arbitrary length prefix with associated next-hop information. Routing lookup must find the routing entry with the longest matching prefix. When an IP router receives a packet, it must compute which of the prefixes in its database has the longest match when compared to the destination address in the packet. The packet is then forwarded to the output link associated with that prefix. For example, a forwarding database may have the prefixes P1=0101, P2=0101101, and P3=010110101011. An address whose first 12 bits are 010101101011 has a longest matching prefix P1. On the other hand, an address whose first 12 bits are 010110101101 has the longest matching prefix P3.

The use of longest matching prefix in forwarding has allowed IP routers to accommodate various levels of address hierarchies, and has allowed different parts of the network to have different views of the address hierarchy. The issue regarding longest prefix matching merits review and innovation.

SUMMARY OF THE INVENTION

The present invention provides a novel IP address lookup method which overcomes certain disadvantages of prior art approaches. IP address look up is a critical issue in high performance routers because of increasing routing table size, speed and traffic in the internet. Previous solutions to this problem first describe in general terms regarding longest prefix matching and, then, are experimented on, with the real routing tables. The present invention uses the opposite method which is a new approach. The new approach starts from the experimental analysis of real data and, based upon the findings, provides a new and simple solution to the IP address lookup problem. In this approach, there is emphasis on expanding the address up to its full prefix lengths if necessary, and the look up table obtained from the expanded address. The inventive method starts out from the expanded table with b $2^{ADDRESS\_SIZE/2}$ entries, forming the so called Lookup table, where address_size=32 (IP address length, considering the IPv4 protocol), and further expands the individual entry up to its address size, if the prefix length is more than address_size/2. The present approach uses an algorithm which requires fewer memory accesses than in the prior art methods. The algorithm takes only two memory references for specific hardware in the worst case, such as IXP1200. It is noted that for generic hardware it generally takes only three memory references in the worst case. Since the entries in the lookup table are 64-bits large, by using generic hardware it needs two memory references. In lookup operation, the first half of the IP address is used as the offset in the Lookup table, and the high 32-bit value at that address decides the subsequent memory references. Experiments on real routing tables for m=32 show that the space requirement is within constraints in the present approach. This approach can easily be expanded for the IPv6, by doing optimization on memory requirement, and on the size of the lookup table. The leading improvement in this scheme over the existing prior art schemes is that, it does not require any sorting algorithms to incorporate the changes of the routing tables.

The invention in one form resides in a method of performing IP address lookup for packet forwarding, by finding a longest prefix match for a destination address, comprising the steps of: ascertaining a maximum address size in number of bits n; making a lookup table with $2^{n/2}$ entries; expanding a given IP address to be matched, if its prefix length is more than n/2; and, completing a lookup operation using said table, to enable packet forwarding.

In a second form, the invention resides in a method of performing an IP address lookup operation using a lookup table where a maximum address size of a given IP address has 32 bits, comprising the steps of: making a lookup table with $2^{16}$ entries; further, if an IP prefix length is more than 16 bits, then expanding the given address to be matched to its full prefix length; and, completing the lookup operation. Also disclosed herein is a computer readable medium encoded with data/instruction which when executed by a computing platform results in execution of the method recited above.

BRIEF DESCRIPTION OF THE DRAWING

A more detailed understanding of the invention may be had from the following description, given by way of example and to be understood in conjunction with the accompanying drawing wherein.

DETAILED DESCRIPTION

A detailed description of one or more embodiments of the invention is provided below along with accompanying figures that illustrate by way of example the principles of the invention. While the invention is described in connection with such embodiments, it should be understood that the invention is not limited to any specific embodiment. On the contrary, the scope of the invention is limited only by the appended claims and their equivalents, and the invention encompasses numerous alternatives, modifications and variations. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

Described herein is a novel practical solution to longest prefix match, by expanding the IP address up to its prefix length. This solution, for specific hardware, requires only two-memory references in the worst case irrespective of the number of the entries in the routing table and the IP version. This approach is termed the X2P approach. The term X2P is basically XXP, which implies expansion, and further expansion based on the prefix length. In this inventive approach, expediently, the main emphasis is placed on those values whose prefix length is more than half of the IP address length.

Figure 1:
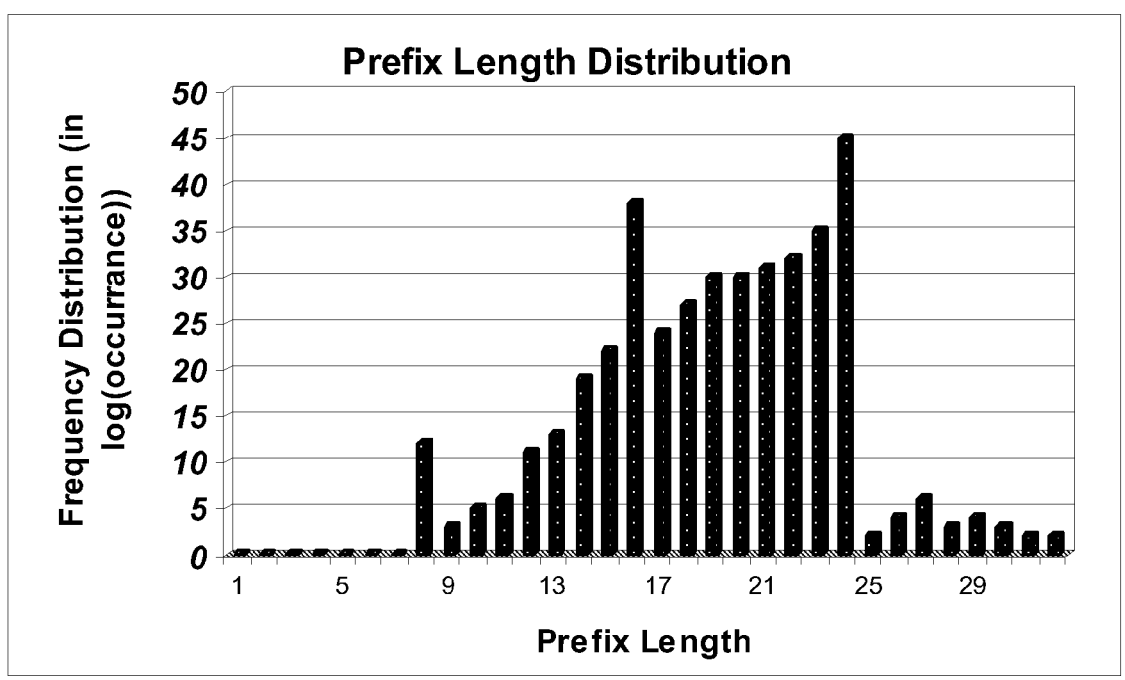
FIG. 1 illustrates the routing table distribution of a typical backbone router.

FIG. 1 illustrates a histogram showing the routing table distribution of a typical backbone router. It can be seen that the entries are not equally distributed over different prefix lengths. The distribution in the illustrated histogram leads to the idea of this new approach for building the lookup table.

The new approach described is intended to solve the IP lookup problem in terms of ADDRESS_SIZE-bit addresses. As illustrated in FIG. 1, the prefix length of most IP addresses generally lies between 8, and 24. The first 16 bits of the address may be chosen, and a lookup table made for 64k entries. Now if a table of 64K entries is made, where each entry is based on the first 16-bits of the IP address, then for the rest of the address bits, for longest prefix matching, it suffices to expand only those entries whose prefix length is more than 16 (—the number 16 is not mandatory—). Thus this approach has the main emphasis on those prefixes which have a length that is more than half of the maximum known length 'n' of the total IP address. If for instance, 'n' is other than 32, the prefix length is somewhat different. If for example, it is intended to make the lookup table for the first 14 bits, that is $2^{14}$ entries, the memory requirement is minimal, and it is sufficient to opt for the first 14 bits instead of making the table for $2^{16}$ entries.

Figure 2:
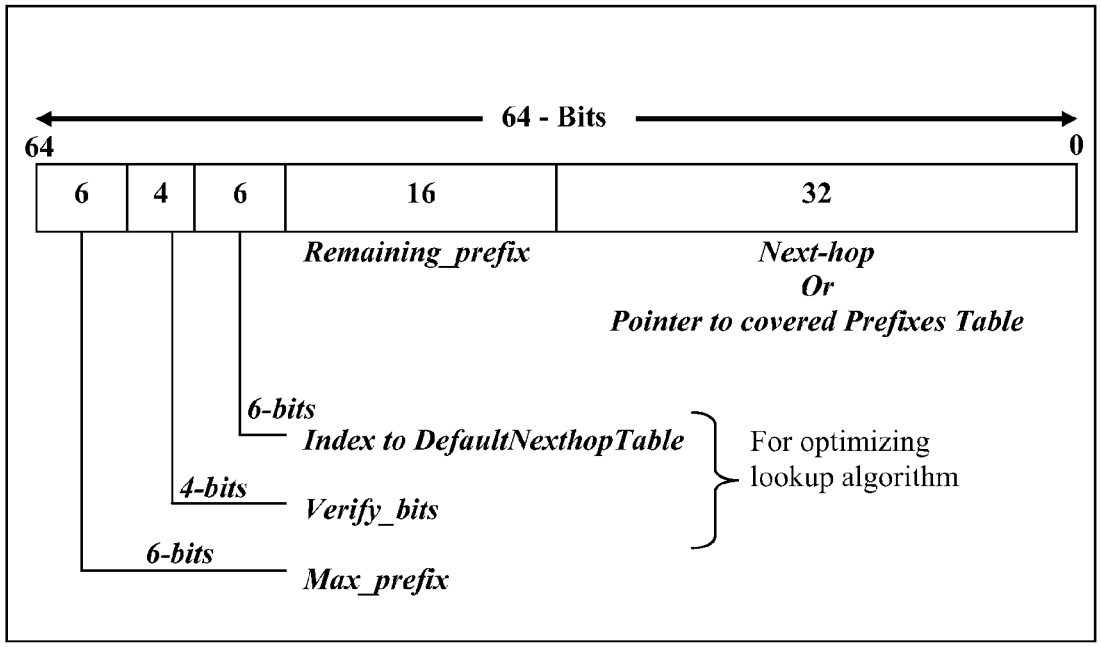
FIG. 2 illustrates an example of the bit representation of each entry.

Lookup Table Data Structure:

In the embodiment described herein, a separate lookup table is made for the address lookup of the incoming packets. The lookup table is built based on the routing table entries. Expediently, the lookup table has $2^{16}$ entries (64K entries). Each entry is 64 bits long. Bit representation of each entry is illustrated for example in FIG. 2. With specific reference to FIG. 2, the details of various fields of each element of the lookup table structure, by way of example, are as follows:

Max_prefix:L

The entries in the routing table, whose high 16 bits are common, are collectively defined by "PrefixGroup". Each PrefixGroup has a number of entries, where each entry has the high 16 bits in common. A PrefixGroup corresponds to a unique entry in the lookup table at the address of its first 16-bit value. It is noted that Max_prefix is the maximum prefix length among the entries in that particular Prefix Group.

Max_prefix=(Maximum of the prefix length in the that particular PrefixGroup) For ex, Consider for example, the entries in the routing table below:

| IP Address | Net mask/Prefix Length | Next-hop |
|---|---|---|
| — | — | — |
| A1b2c3d4 | 17 | 01020304 |
| A1b2c4d5 | 18 | 02030405 |
| A1b2c5d6 | 19 | 03040506 |
| — | — | — |

These entries in the above table belong to a unique PrefixGroup, which has its entry at location a1b2 in the lookup table. But a1b2 has three different entries in the routing table with different next-hops, and different prefix lengths, which in fact forms this PrefixGroup. So the maximum prefix length from amongst these entries is chosen as the Max_prefix. In this case the Max_prefix is 19.

The next 10 bits are used for simplifying the implementation, and lookup logic. These 10 bits can be broken down into 4-bits as Verify_bits and 6-bits as the Index to DefaultNexthopTable.

| Verify_bits | Index to DefaultNexthopTable |
|---|---|
| 4-bits | 6-bits |

Verify_bits:

Verify_bits are used to maintain the number of bits needed to be extracted from the Remaining_prefix field of the lookup table.

Index to DefaultNexthopTable:

These 6-bits are used for holding the sequence number in the DefaultNexthopTable. Here the default nexthop is categorized as Local_Default_Nexthop, and the Global_Default_Nexthop. The Global_Default_Nexthop is assigned to those entries in the Lookup table, which have no corresponding entry in the Routing table. The Local_Default_Nexthop corresponds to those sets, which are the subset of some other entry whose prefix length is less than or equal to ADDRESS_SIZE/2. This situation arises when one entry of the Routing Table is the subset of the other, and the entry that is the superset, has its prefix length less or equal to ADDRESS_SIZE/2. In such a scenario, when the Remaining_prefix does not match with the extracted Verify_bits value of the destination address, the Local_Default_Nexthop will be set as its default nexthop. The sequence number is the index number in the DefaultNexthopTable, where the corresponding local default is maintained.

Remaining_prefix:
This is the prefix value that is used for doing comparison.
Remaining_prefix=This value represents the common bits of the IP addresses starting from bit number 16 in a PrefixGroup. The rest of the bits are padded by '0' towards the LSBs to make it 16-bits large.
For example, consider this piece of routing table:

| IP Address | Net mask/Prefix Length | Next-hop |
|---|---|---|
| — | — | — |
| A1b2c3d4 | 20 | 01020304 |
| A1b2c4d5 | 22 | 02030405 |
| A1b2c5d6 | 24 | 03040506 |

In the above table, three different entries of a PrefixGroup that correspond to the value a1b2 in the lookup table are shown. They have prefix lengths of 20, 22, and 24. Now it is checked if there is any bit string common among them, starting from bit 15 to bit 12 (because minimum prefix length in the group is 20). The common bit string is extracted, padded with zeros at LSBs to make it 16-bits large (means left shifting till it is 16-bits large) and put in to the Remaining_prefix field of the lookup table. It is used to compare with the incoming IP packet destination address when performing the lookup. Thus by doing so, it is possible to minimize the size of the Covered Prefixes Table.

So the Remaining_prefix would be 'c000' here, and consequently, the extended table size reduces from 256 ($2^8$) to 16($2^4$).

It is noted that in case of a single entry having prefix length more than 16 in a PrefixGroup, the remaining bits of the address (i.e., lower 16 bits of the address) will be placed in the Remaining prefix field and the Verify_bits and Index to DefaultNexthopTable will be updated accordingly.

Next-Hop/Pointer to Covered Prefixes Table:
This field represents either the next-hop value or a pointer to Covered Prefixes Table. Covered Prefixes Table is a table covering the rest of the prefixes, which are still not considered. Basically Covered Prefixes Table is built for those entries whose prefix length is more than the (ADDRESS_SIZE/2+Verify_bits). It is actually the expansion of the prefixes up to the maximum prefix length so that all the entries belonging to that PrefixGroup can be incorporated.

A Covered Prefix Table contains the nexthop value of all the entries of a particular PrefixGroup. Each Covered Prefix Table is unique for a PrefixGroup. The size of this table is equal to Max_prefix−(ADDRESS_SIZE/2+Remaining_prefix value).

A simple condition for knowing whether this field denotes next-hop or pointer to Covered Prefix Table is given below:

```
THEN
    Next-hop = Next_hop field contains the next hop entry.
ELSE IF Max_prefix > (ADDRESS_SIZE/2 +number of bits in
Remaining_prefix)
    THEN
    Next-hop = Pointer to the "Covered Prefixex Table"
```

Memory Optimization:
In the present approach there is emphasis on reduction of the expanded table size. So, to optimize the memory requirement in the expanded tables, the maximum common value among all those prefixes is first found out, which belongs to a single PrefixGroup and then the common bits starting from $16^{th}$ position in the lower half are extracted. The number of common bits is stored in Verify_bits, and the common value is stored in Remaining_prefix field, after padding with '0' to make 16-bits large. Thus for a single common bit, the expanded table size can be reduced by half of the scenario in the previous one. If there is any entry in the PrefixGroup whose prefix length is less than ADDRESS_SIZE/2, then this entry is not considered while calculating the common bit string. This also reduces the size of the Covered Prefixes Table. This entry is related to only the Local_Default_Nexthop for this particular entry in the lookup table. So the Index to DefaultNexthopTable field of the Lookup table is updated.

Lookup Algorithm:
The lookup procedure is carried out as in the algorithm below by way of example:

```
Get offset in Lookup table based on first half of IP address of the
incoming packet.
IF (Max_prefix <= ADDRESS_SIZE/2)
    Nexthop = low 32 bits of the quad word read (Next_hop value of the
              Lookup table)
ELSE
    Verify_bits = ( high 32-bits ) & 0x03c00000 >> 22
    IF (Verify_bits = = NULL)
        Nexthop = (low 32 bits)->(get the offset by expanding to the
                  Max_prefix – ADDRESS_SIZE/2)
    ELSE(
        Extract Verify_bits from the incoming packet IP destination
        address starting at location of 16th bit, and from the
        Remaining_prefix field of the Lookup table
        IF (both are same)
            Nexthop = (low 32 bits)->(get offset by expanding the
                      Max_prefix after subtracting the sum
                      of ADDRESS_SIZE/2 + Verify_bits
                      from it)
        ELSE
            LocalDefaultNexthop = (high 32-bits & 0x003f0000) >> 16
            Nexthop = Value at position Local_Default_Nexthop in the
                      DefaultNexthoptable
ELSE Nexthop = Global_Default_Nexthop.
```

Figure 4:
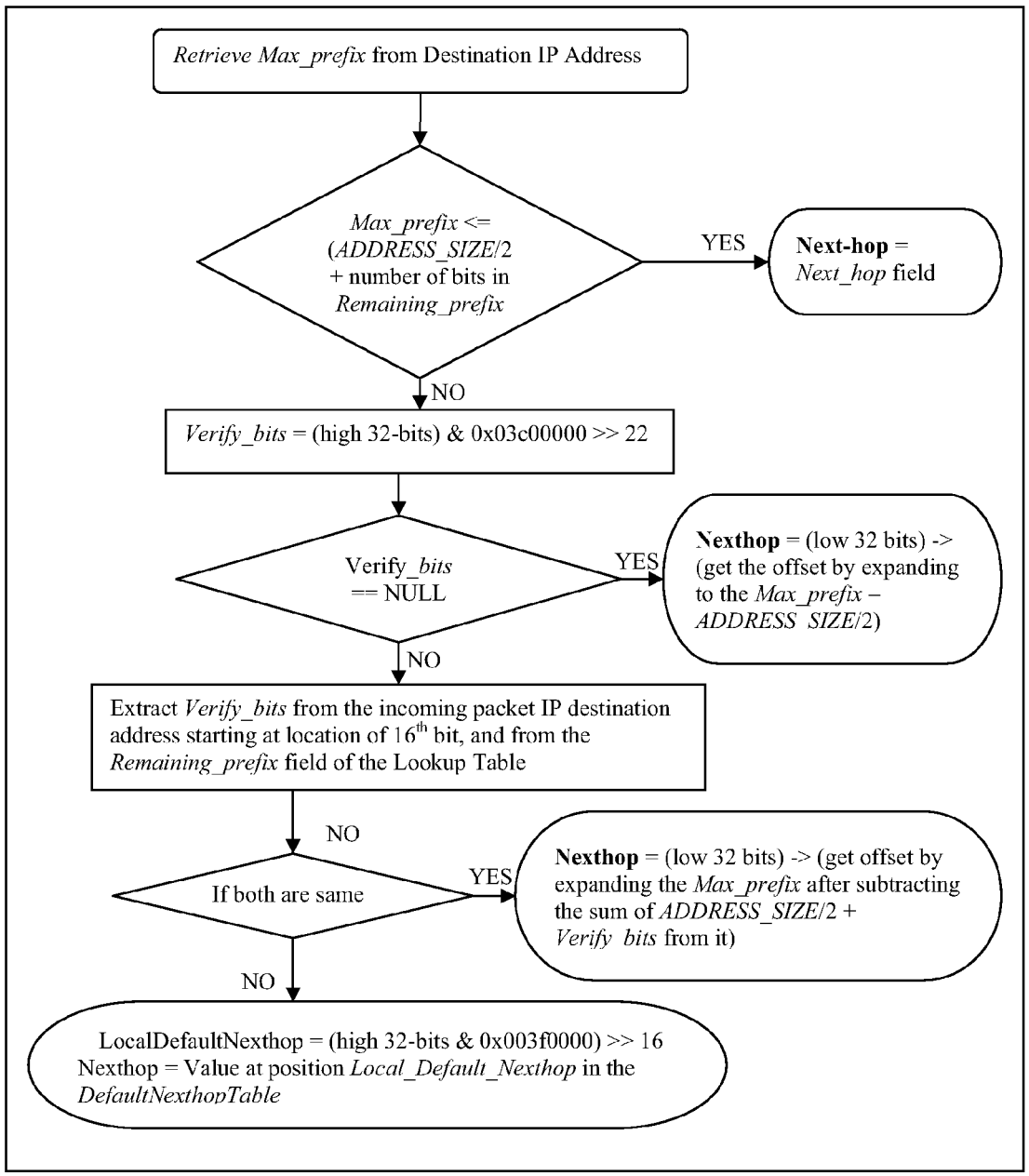
FIG. 4 illustrates a nexthop lookup process in an exemplary algorithm.

FIG. 4 illustrates a flowchart illustrating the nexthop look process in the exemplary algorithm shown above, wherein the flowchart includes steps recited in the above algorithm. When a packet comes for lookup, the high 16 bits are extracted from its destination IP address field, Based on its value, one offsets into the lookup table and reads one quad word of data. Since that quad word contains the defined data structure, the Max_prefix value, which is in fact the maximum prefix length to the corresponding entry, is extracted. And based upon that value, the Next_hop field of the read quad word is treated as either a next-hop or a pointer to a Covered Prefixes Table. The number of Verify_bits are extracted from Remaining_prefix as well as the destination address of the incoming packet, and in case of a match, this value determines the exact location in the Covered Prefixes Table. And in case of mismatch, the packet is routed to a default router whose index is obtained by the Index to DefaultNexthopTable field, and mapped to this Default Nexthop Table.

Addition and Deletion of the Route Entry:

In this approach, the addition and deletion of any routing table entry is easily incorporated in the lookup table. The biggest advantage of this scheme over the prior art schemes is that, in the addition and deletion operation, one does not need to sort the whole table. Only the corresponding entry needs to be changed. The case of addition is considered first.

Addition of any Route Entry:

If there is any entry added in the routing Table, then its effect is immediately

---

ADD_ROUTE (prefix_value,prefix_len, nexthop)
Index = prefix_value >> ADDRESS_SIZE /2;
PrefixInfo = high 32 bits of the quad word read (PrefixInfo value of the Lokup Table)
IF(PrefixInfo == 0 )
  Update the Lookup table entry at Index value.
ELSE
  Evaluate Max_prefix, Verify_bits from this PrefixInfo.
  IF(Max_prefix > 16 && prefix_len > 16 )
    Recalculate the Verify_bits and updates the Covered Prefixex Table accordingly.
  ELSE IF (Max_prefix <= 16 && prefix_len > 16)
    Calculate the Verify_bits, updates the Index to DefaultNexthopTable, and updates the Next_hop field.
    ELSE
      Update the Index to DefaultNexthopTable of all the entries of the Lookup table whose Index lies in its range.

Figure 5:
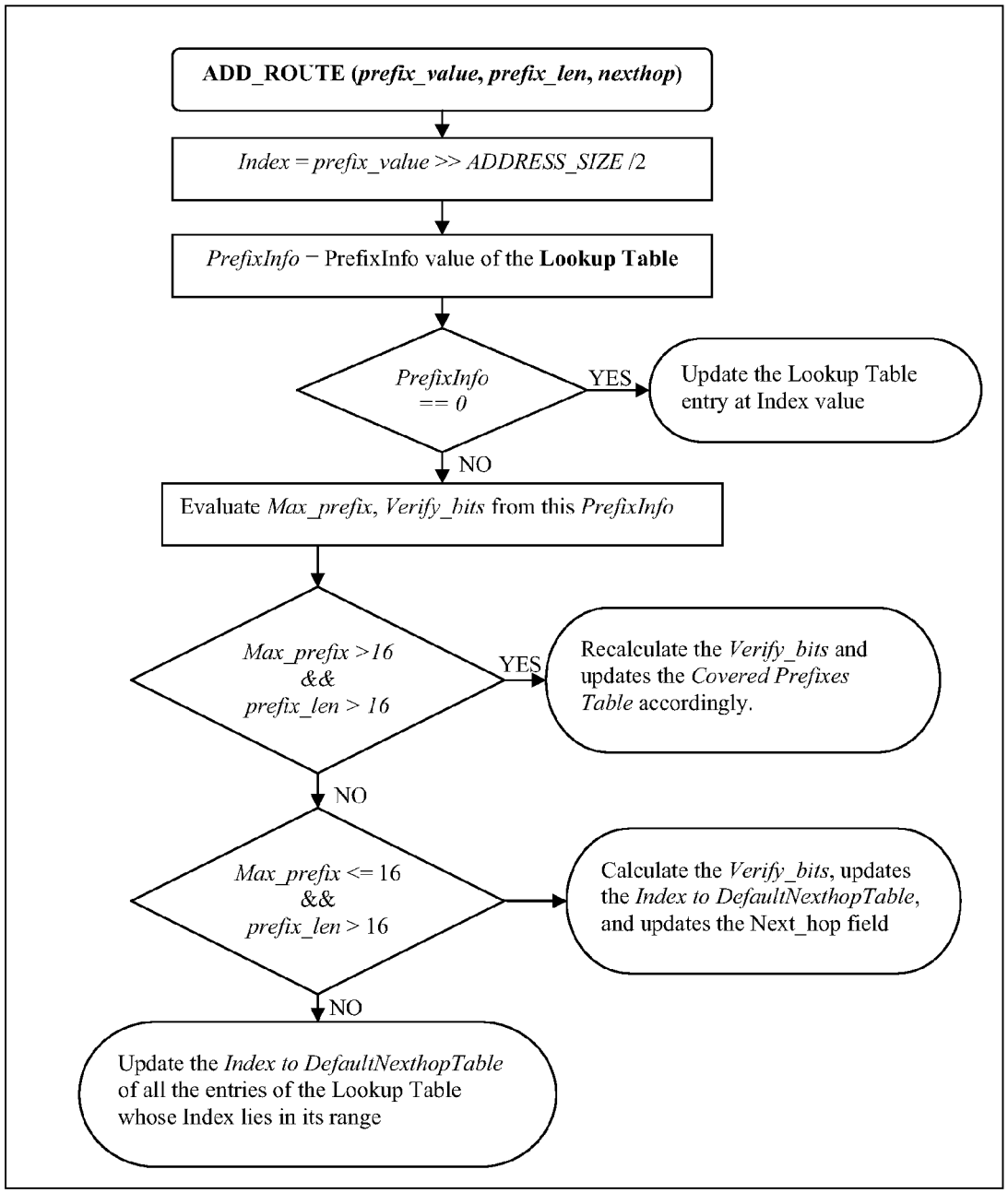
FIG. 5 illustrates an exemplary route-add logic algorithm.

--- incorporated in the lookup table. For that, first of all, first ADDRESS_SIZE/2 bits of the IP address of this new entry are extracted, and the exact location in the lookup table is reached. Then the Max_prefix value is retrieved, and compared with this new entry prefix value. FIG. 5 illustrates a flowchart which incorporates the steps from the above add logic algorithm.

If this new prefix value is less than that at Max_prefix, then this value is left unchanged, the Verify_bits is updated, and accordingly the Covered Prefixes Table for the corresponding next hops is updated too. In the second scenario, when the new prefix value is more than that of the Max_prefix value, the Max_prefix value is updated. Now the Verify_bits and Remaining_prefix is evaluated and modified accordingly. And similarly the Covered Prefixes Table is also updated.

Figure 6:
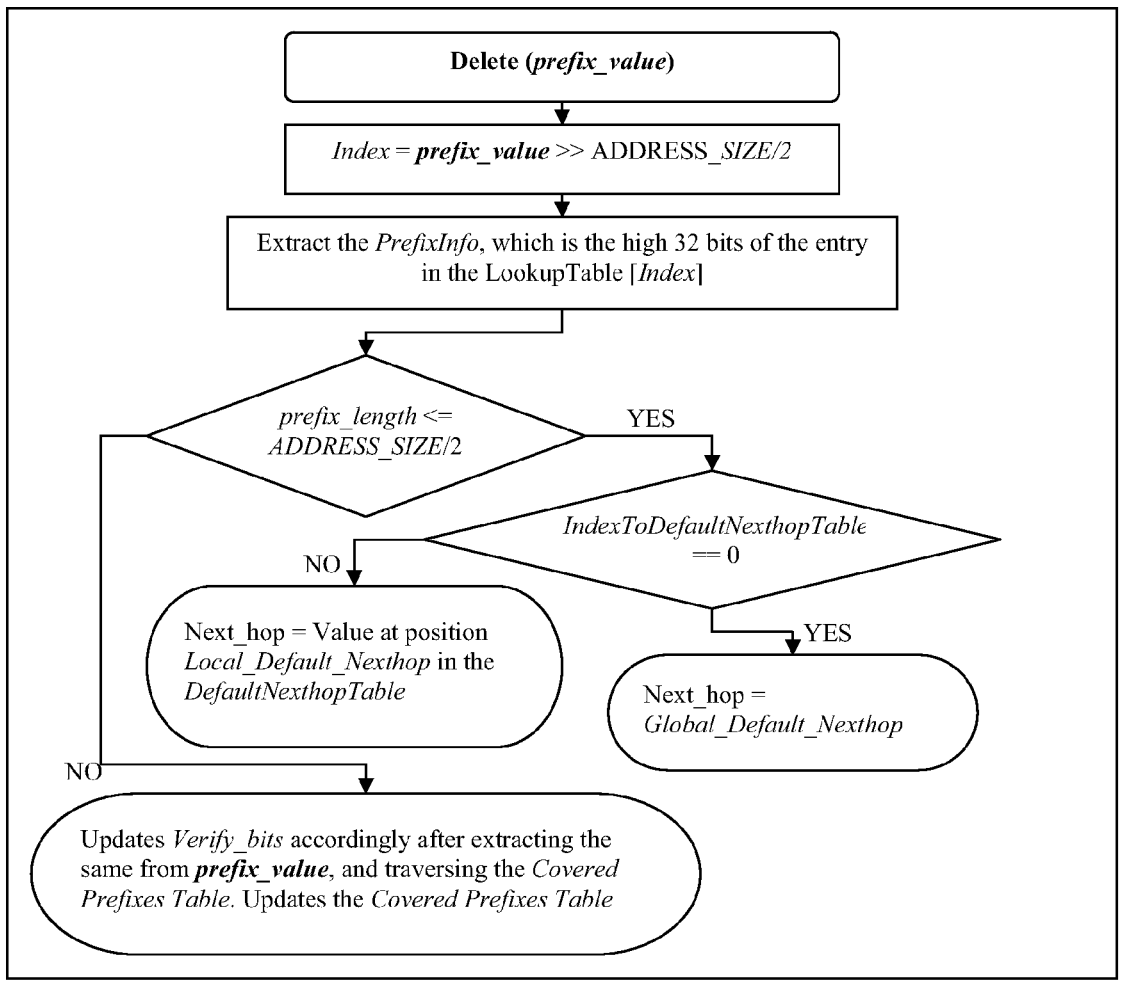
FIG. 6 illustrates an exemplary route-delete logic algorithm.

Deletion of any Routing Entry:

In this case first, the exact location of that entry in the lookup table is traced and then if that entry that the Max_prefix has is less than ADDRESS_SIZE/2, and then its Next_hop field is updated to a default value. On the other hand, when its Max_prefix is more than ADDRESS_SIZE/2, then the Remaining_prefix value is extracted, and tracing the pointer the exact address location in the Covered Prefixes Table in obtained. After that the required modifications are done. A simple form of algorithm for deleting any route entry is as follows, and is also shown in the FIG. 6 flowchart.

---

Delete (prefix_value)
Index = prefix_value >> ADDRESS_SIZE/2
Extract the PrefixInfo, which is the high 32 bits of the entry in the Lookup table[Index]
IF (prefix_length <= ADDRESS_SIZE/2)
  IF (IndexToDefaultNexthopTable == 0)
    Next_hop = Global_Default_Nexthop
  ELSE
    Next_hop = Value at position Local_Default_Nexthop in the DefaultNexthoptable
ELSE
  Updates Verify_bits accordingly after extracting the same from prefix_value, and traversing the Covered Prefixes Table.
  Updates the Covered Prefixes Table.

---

Figure 3:
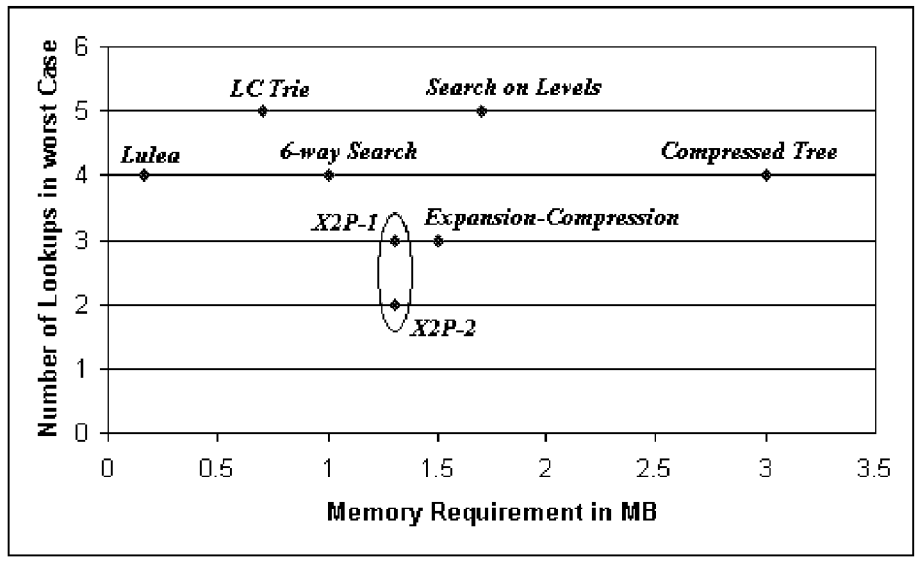
FIG. 3 illustrates the memory requirement in MB for the present embodiment compared to other methods of address prefix matching.

Performance Comparison:

The illustration in FIG. 3 shows the trade-off between the worst-case lookups and the memory requirement in MB for different approaches in IP address lookups, including the present approach. An additional parameter that decides the memory requirement is the nature of the routing table entries. Nevertheless, the illustration in FIG. 3 shows the trend in the memory requirement in MB, wherein it is seen that the memory requirement in the present invention is relatively lower compared to the prior art scenarios. With specific reference to FIG. 3, X2P-1 corresponds to generic hardware, while X2P-2 corresponds to specific IXP1200. This trade-off is for Mae-East routing table (which has ≈40,000 entries). Both the X2P-1 and X2P-2 approaches require fewer lookups compared to other known methods discussed below.

The following other methods of IP address lookup are shown in FIG. 3 for comparison:

LC Trie, is based on the compression of the routing tables by means of level and path compressed Patricia Trie. It is noted that LC Trie is a powerful and space efficient representation of the binary tries. But it requires 5 memory references in order to find the longest prefix match for that address.

Lulea, is a more recent approach based on the three-level data structure, which uses a clever scheme to compress multibit Trie nodes using a bitmap. This approach is very efficient from a memory size point of view, but it requires many bit operations along with 4 memory accesses in worst case.

Search on Levels is an approach based on binary search on hash tables organized by prefix lengths. This technique is more memory consuming than the other ones.

6-way Search is completely a different way of using binary search. It is based on multi-way search on the number of possible prefixes rather than the number of possible prefix lengths.

Expansion-Compression is the most recent approach based on the experimental analysis of the real data. It basically uses the RLE encoding for maintaining the Lookup tables. According to the experimental evaluation known to the inventor, the present approach seems to be significantly more efficient.

The X2P scheme, presented here, gives a reasonable trade-off between the number of the worst cases and the memory required. The code for this algorithm is implemented in ANSI C, and is compiled by using the GCC compiler under Linux® operating system. The measurements are obtained on the PIII, of 700 MHz, with the 256 KB of cache on the processor. For this configuration, search of MaeEast routing table entries is evaluated in 0.14 μseconds or, equivalently, this method performs 7-8 millions of lookups per seconds.

The X2P technique described hereinabove gives a unique view of the application of expanding the entries up to their prefix lengths in a PrefixGroup, giving the view as if all the entries are expanded up to their full prefix lengths individually. An efficient data structure is introduced to compress the common prefix value in the PrefixGroup such that the number of memory accesses to find the longest prefix of any address is independent of the routing table entries. The leading advantage of this scheme as described above is the dynamic insertion and deletion, for which there is no need to sort the whole table, as in other existing schemes. With locality in traffic, lookup speeds will be even higher in the present approach. The present approach also assists to optimize the Covered Prefixes Table size.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A method of performing IP address lookup for packet forwarding, by finding a longest prefix match for a destination address, comprising the steps of:
   ascertaining a maximum address size in number of bits n;
   making a lookup table with $2^{n/2}$ entries, wherein the lookup table has $2^{16}$ entries, and each entry is 64 bits long, and wherein each 64 bit long entry includes 6 Max_prefix bits at an MSB end, followed by 4 Verify_bits, followed by 6 bits for Index to Default Nexthop table, followed by 16 bits remaining_prefix, followed by 32 bits for next-hop;
   expanding a given IP address to be matched, if its prefix length is more than n/2; and,
   completing a lookup operation using said table, to enable packet forwarding.

2. The method as in claim 1, including the step wherein the 16 bits for remaining_prefix is used for comparison.

3. The method as in claim 1, wherein the step of prefix expanding, includes padding bits after the 16 bits for the remaining_prefix with '0's towards LSB (Least Significant Bit) to make it 16 bits long, making a total of 32 bits.

4. The method as in claim 3, including the step wherein a common bit string in a prefix group is extracted, padded with '0's at an LSB location to make it 16 bits long and put into the Remaining_prefix.

5. The method as in claim 4, including the step wherein in a prefix group, when there is a single entry having a prefix length more than 16 bits, those remaining bits of the address which are lower than 16 bits of the address are placed in the Remaining_Prefix field, and including the step of updating Remaining_prefix index, updating Verify_bits and Index to Default Nexthop table.

6. The method as in claim 5, including the step of building Covered Prefixes table for those entries whose prefix length is more than half the address size+ Verify_bits.

7. The method as in claim 6, wherein a size of each covered Prefix Table is equal to Max_Prefix- (Address size/2+Remaining_Prefix value).

8. The method as in claim 1, including the step wherein the 6 bits for Index to Default Nexthop table are used for holding a sequence number in Default Nexthop table.

9. The method as in claim 8, wherein said Default Nexthop in said Default Nexthop table comprises Local_Default_nexthop and Global_Default_Nexthop.

10. The method as in claim 9 including the step wherein if a Remaining_prefix does not match with extracted_verify bits value of a destination portion of the IP address, the Local_Default_Nexthop will be set as its Default Nexthop.

11. The method as in claim 1, including the step wherein an Index to Default Nexthop Table field of the lookup table is updated.

12. The method as in claim 1, configured for IPv4 protocol.

13. The method as in claim 1, where n comprises a number other than 32.

14. The method as in claim 1, configured for IPv6 protocol.

15. The method as in claim 1, including the step wherein a first half of the IP address is used as an offset in said lookup table.

16. The method as in claim 1, wherein for IP address matching, only two memory accesses are needed.

17. The method as in claim 16, wherein a high 32 bit value at the IP address decides subsequent memory references.

18. The method as in claim 1, including the step of using generic hardware for completing address lookup, wherein only three memory accesses are sufficient for completing IP address lookup.

19. A method of performing an IP address lookup operation using a lookup table where a maximum address size of a given IP address has 32 bits, comprising the steps of:
   making the lookup table with $2^{16}$ entries, wherein each entry is 64 bits long, and wherein each 64 bit long entry includes 6 Max prefix bits at an MSB end, followed by 4 Verify_bits, followed by 6 bits for Index to Default Nexthop table, followed by 16 bits Remaining_prefix, followed by 32 bits for next-hop;
   if an IP prefix length is more than 16 bits, then expanding the given IP address to be matched to its full prefix length; and,
   completing the IP address lookup operation using the lookup table.

20. A computer readable storage medium having instructions encoded thereon, which when executed by a computing platform result in execution of the method as in claim 1.

21. A computer readable storage medium having instructions encoded thereon, which when executed by a computing platform result in execution of the method as in claim 19.

* * * * *